United States Patent [19]

Chang

[11] Patent Number: 5,698,626
[45] Date of Patent: Dec. 16, 1997

[54] FUNCTIONAL GROUP TERMINATED POLYMERS CONTAINING SULFONATE GROUP VIA POLYMERIZATION OF SULFONATED MONOMERS

[75] Inventor: Wally L. Chang, Naperville, Ill.

[73] Assignee: Witco Corporation, Greenwich, Conn.

[21] Appl. No.: 768,662

[22] Filed: Dec. 18, 1996

[51] Int. Cl.$^6$ ................................................. C08G 63/68

[52] U.S. Cl. ........................... 524/603; 524/609; 528/293; 528/294

[58] Field of Search ........................ 524/603, 609; 528/293, 294

[56] References Cited

U.S. PATENT DOCUMENTS

| | | | |
|---|---|---|---|
| 4,304,900 | 12/1981 | O'Neill | 524/602 |
| 4,304,901 | 12/1981 | O'Neill | 524/603 |
| 4,946,932 | 8/1990 | Jenkins | 528/294 |
| 5,281,650 | 1/1994 | Burk | 526/287 |

*Primary Examiner*—Paul R. Michl
*Attorney, Agent, or Firm*—Scully, Scott, Murhpy & Presser

[57] ABSTRACT

Disclosed is a process for producing water-dispersible polymers, particularly condensation polymers such as polyesters, and polyamides, by sulfonating an ethylenically unsaturated monomeric precursor and then condensation polymerizing the sulfonated precursor with a second monomer.

21 Claims, No Drawings

FUNCTIONAL GROUP TERMINATED POLYMERS CONTAINING SULFONATE GROUP VIA POLYMERIZATION OF SULFONATED MONOMERS

BACKGROUND OF THE INVENTION

The present invention relates to water-dispersible polymers, and more particularly to water-dispersible polyesters, polyamides and polyethers as well as copolymers thereof.

Polyester resins, as well as polyamide and polyether resins, find use in a variety of applications, including coatings, paints, adhesives, and the like. Such resins are typically soluble in organic solvents, and exhibit little if any solubility in aqueous solvents or in systems in which water and a second water-soluble solvent are employed. Organic solvent-based resin solutions have thus typically been the vehicle of choice for use in forming coatings and the like of the resins. However, many organic solvents commonly used in conjunction with such resins present environmental problems associated with their toxicity. There has been a growing concern based on the effects of such organic solvents on the environment, as well as on the long-term health of individuals who come into contact with such solvents. There has, therefore, been a growing interest in the use of aqueous resin compositions as a means of eliminating toxicity problems associated with organic solvents, and as a means of complying with governmental edicts with respect to the use of such solvents.

Examples of aqueous polyester and other resin dispersions are known in the art. The dispersion of the resin into the aqueous medium has customarily been achieved through the use of dispersing or emulsifying agents such as nonionic or ionic surfactants. However, the use of surfactant-stabilized aqueous resin dispersions is far from desirable, since a proportion of free surfactant can be carried through to the final product, which can result in a diminution of the desired properties of the final product.

The prior art has thus attempted to incorporate moieties directly into the polymer molecule which affords greater water dispersibility to the polymer. Typically, these attempts involve copolymerization of a water-soluble or water-dispersible comonomer together with the other monomers which react together to form the desired polymer molecule. Typical of this approach is U.S. Pat. No. 3,563,942, which discloses copolymerization of an aromatic sulfonate moiety in the synthesis of the desired polyester polymer.

Similar approaches are disclosed in U.S. Pat. Nos. 4,525,524, 4,910,292, and 4,973,656, which disclose other techniques for copolymerizing a sulfonate-type monomer directly into the polymer when it is formed from its monomeric constituents. These techniques require very high reaction temperatures, whereas the process of the present invention can be carried out at much milder, less energy-intensive conditions themselves.

The prior art approach to the objective of incorporating a water-dispersible moiety into the polymer molecule has other drawbacks in addition to the severe reaction conditions. Notable among these is the fact that under such severe reaction conditions, the polymer easily decomposes and/or is converted to a yellowish or dark product. This decomposition is difficult to control or eliminate. Also, aromatic sulfonates can cause 1, 4-butanediol, which is ordinarily a preferred reactant, to be converted to tetrahydrofuran; and can cause diethylene glycol, another preferred reactant, to be converted to dioxane. These conversions occur because of the strong acidity of the aromatic sulfonate. Both such conversions are undesirable as they lead to losses of yield and to unsatisfactory properties of the product. It is also difficult to identify satisfactory water-dispersible, e.g. sulfonate-based, comonomers which can successfully copolymerize with the other comonomers to form the desired copolymeric product. The reaction conditions that become necessary are constrained by the additional comonomer present, such that harsher reaction conditions are often required that are in turn more difficult to control.

It is thus an object of the present invention to provide an improved technique for forming water-dispersible polymeric resins, particularly resins formed by condensation polymerization such as polyesters, polyamides and polyethers, which technique affords improved ease of operation, more satisfactory yields, improved properties (such as desirably light color of polyesters and polyethers produced by this invention), and offers a greater variety in the selection of reactants and in the range of properties of the products that can be obtained.

It is furthermore an object of the present invention to provide an improved process for obtaining such water-dispersible polymers which can be used as final products or can be used as intermediates for the subsequent formulation of other polymeric derivatives such as polyurethanes.

BRIEF SUMMARY OF THE INVENTION

One aspect of the present invention is a process for producing a water-dispersible polymer comprising: (a) sulfonating an ethylenically unsaturated monomeric precursor which has no aromatic ring and which is substituted with at least two groups selected from the group consisting of —OH, —COOH and —NH$_2$, to form a sulfonated monomeric precursor; and (b) reacting said sulfonated monomeric precursor with a difunctional second monomer capable of undergoing condensation polymerization with said sulfonated monomeric precursor, under conditions whereunder said precursor and said second monomer undergo condensation polymerization.

Preferably, said sulfonation is carried out with a sulfonating agent selected from the group consisting of bisulfites, metabisulfites, and mixtures thereof, under conditions such that said sulfonating agent sulfonates said monomeric precursor by reaction at said ethylenic unsaturation.

Optionally, the monomeric precursor is simultaneously sulfonated and end-capped with a difunctional precursor to form a sulfonated, difunctional "dimer" which is capable of undergoing condensation polymerization in step (b).

The polymeric product can be all of one type of polymer, or can comprise two or more (preferably up to four) blocks each of which is a polyester, a polyamide, or a polyether, wherein the blocks are either bonded directly to each other or are each bonded through a —C(O)NH—, —C(O)O— or —O— linkage to an intervening alkyl moiety containing 2 to 20 carbon atoms which is saturated or contains ethylenic unsaturation provided that adjacent blocks bonded directly to each other are types of polymer different from each other.

DETAILED DESCRIPTION OF THE INVENTION

The present invention is useful in making water-dispersible polymers, particularly water-dispersible condensation polymers. The products of the process of this invention can be used per se to form coatings, films and the like. The products of the process of this invention can also be used as intermediates in the formation of other polymeric species, for instance by reacting appropriate diisocyanate compounds or other di-substituted cross linking agents with the carboxylic acid, amino, or hydroxyl substituent groups present on the polymers produced by the present invention.

The condensation polymerization reactions with which the present invention may be used include any reactions among reactants in which appropriate functionalities on the reactants react to form a covalent linkage, the reaction typically (but not always) resulting in the formation of a byproduct molecule, typically water, as a result of the reaction.

The functionalities present on the reactants usually include one or both of —COOH (or anhydride) and/or —COH, and one or both of —OH and —$NH_2$. The reactants that enter into such condensation reactions are usually substituted with two, or more, of such functionalities. More often, reactants are substituted with the same functionalities (e.g., diacids, diols, diamines), but they can be substituted with two or more different functionalities (e.g., amino acids, hydroxyacids).

Preferred examples of condensation polymerization reactions include reactions which form polyesters, polyethers and polyamides. As is well known, polyesters form by the reaction of, for instance, diols with dicarboxylic acids or anhydrides thereof. Polyamides form by the reaction of, for instance, diamines with dicarboxylic acids or anhydrides thereof. Polyethers within the scope of the present invention can be formed by the polymerization of, for instance, ethylene oxide or propylene oxide under ring-opening conditions. Condensation polymerization reactions also include such reactions of glycol or alkoxy-terminated polyethylene glycol with a diacid or anhydride to form a polyester of the polyethlyene glycol.

The polymers within the scope of the present invention also include those composed of blocks wherein blocks adjoining each other are different types of condensation polymers. Examples include polyester/polyamide, polyester/polyether, and polyamide/polyether. Other examples include triblock polymers, wherein the inner block is different from each of the outer blocks which can be the same as each other or different from each other. Examples include polyether/polyester/polyether, and so forth.

Also included are molecules wherein one or two polymeric chains meeting any of the descriptions herein is pendant from an alkyl moiety containing 2 to 20 carbon atoms through a —C(O)NH—, —C(O)O—, or —C—O—C— linkage. An example of this type of compound is that formed by esterifying both carboxylic functionalities of maleic acid or maleic anhydride with polyethylene glycol or polypropylene glycol at a molar ratio of glycol:maleic acid or anhydride of at least 2:1.

One essential aspect of the process of the present invention is that at least one of the difunctional monomeric reactants contains ethylenic unsaturation, that is, a carbon-carbon double bond, either in its main chain or pendant from its main chain.

Thus, for instance, the desired ethylenic unsaturation is present as an ethylenically unsaturated diacid, an ethylenically unsaturated anhydride (such as maleic anhydride), an ethylenically unsaturated diol, an ethylenically unsaturated diamine, or mixtures of any two or more of such compounds. Also, ethylenically unsaturated compounds which contain nonidentical functional groups can be used.

The ethylenically unsaturated diacid component can comprise in whole or in part one or more ethylenically unsaturated polycarboxylic acids, especially dicarboxylic acids or their anhydrides, including but not limited to fumaric acid, maleic acid, mesaconic acid, citraconic acid, muconic acid (e.g. trans-trans muconic acid) and itaconic acid, and any anhydrides thereof, such as maleic anhydride. In general, the preferred ethylenically unsaturated dicarboxylic acids and anhydrides will contain 4 to 8 carbon atoms but may contain anywhere from 4 to 36 carbon atoms.

Diacids wherein the ethylenic unsaturation is pendant from the principal chain of the diacid are also contemplated within the scope of the present invention. Examples include any of the dicarboxylic acids disclosed herein, and their anhydrides, having a pendant chain containing 2 to 8 carbon atoms at least two of which are connected by a carbon-carbon double bond, such as vinyl, propenyl, butenyl, and the like. One example is 2-vinyl-butane-1, 4-dioic acid.

Preferred ethylenically unsaturated diol compounds contain 4 to 10 carbon atoms. Examples of such compounds include allyl diglycol, as well as any ethylenically unsaturated analogs of the exemplary glycols set forth herein.

Included within the scope of ethylenically unsaturated diols useful in the process of the present invention are those wherein the ethylenic unsaturation is present in, or in a substituent pendant from, the chain connecting the two diol groups. Preferred examples include the mono-acrylates and mono-methacrylates of triols such as glycerol, wherein two hydroxyl groups remain available to cooperate in the formation of the polyester molecule. Other examples of satisfactory ethylenically unsaturated diols include 1,4-butenediol, 1,4-butynediol, glycerine allyl ether and glyceryl monostearate.

Ethylenically unsaturated diamines can also be used. Preferably they contain 2 to 12 carbon atoms and can be straight or branched-chain. Preferred diamines include straight and branched chain diamino-substituted alkenes, esters and amides such as diamino analogs of any di-hydroxyl (e.g. glycol) derivatives disclosed herein.

In the first step of the process of the present invention, the ethylenically unsaturated monomeric precursor (e.g. diacid, anhydride, diol, or diamine) is sulfonated. Sulfonation is carried out by reacting the compound under appropriate sulfonating conditions with a sulfonating agent which comprises one or more bisulfites and/or one or more metabisulfites. Preferred sulfonating agents are the ammonium and alkali metal sulfites and alkali metal metabisulfites. Thus, the more preferred sulfonating agents are sodium bisulfite and sodium metabisulfite. Other preferred sulfonating agents include lithium bisulfite, lithium metabisulfite, potassium bisulfite, potassium metabisulfite, ammonium bisulfite and ammonium metabisulfite.

Sulfonation of the monomeric precursor should be carried out using a stoichiometric excess of the sulfonating agent. The sulfonation is preferably carried out in a suitable solvent such as water. Satisfactory sulfonation conditions include maintaining a temperature of about 10° C. to about 120° C. for a time on the order of 2–15 hours. The sulfonation also can be catalyzed by fine air bubbles purged through the reaction medium, or by any peroxides such as hydrogen peroxide, benzoyl peroxide, or t-butyl hydrogen peroxide.

Optionally, one may include in the reaction mixture of ethylenically unsaturated difunctional monomeric precursor and sulfonating agent, a second difunctional precursor reactant which enters into a condensation reaction with the ethylenically unsaturated monomeric precursor and endcaps it. If such another reactant is present, the reaction product is a sulfonated difunctional dimer which contains an amide, ether or ester linkage, depending on the chemical identity of the reactants and thus the nature of the endcapping reaction. Compounds suitable for use as the second difunctional precursor include compounds substituted with at least two groups selected from the group consisting of —OH, —NH$_2$ and —COOH at least one of which can enter into a condensation reaction with the monomeric precursor. Examples include diacids, diols and diamines containing 2 to 8 carbon atoms, such as 1,6-hexanediol and 1,6-diaminohexane.

Whether or not the indicated optional reactant was also present, the product of the first step of the process of the present invention is a sulfonated product, at least di-substituted with groups selected from the group consisting of —OH, —COOH and —NH$_2$. This product is termed a monomeric precursor in that it has either no, or at most one, —C(O)NH— or —C(O)O— linkage. This product must be capable of undergoing condensation polymerization with a suitable difunctional second monomer in the second step of the present invention.

The second step of the present invention can be carried out with any of a considerable number of reactants. The choice depends on the nature of the functional groups present, and in part on the properties desired of the eventual product.

One reactant preferably employed in the desired condensation polymerization reaction is a diacid component, by which is meant one or more dicarboxylic acids, one or more anhydrides of dicarboxylic acids, or mixtures thereof.

The dicarboxylic acids that can be used in the present invention include aliphatic dicarboxylic acids, alicyclic dicarboxylic acids, aromatic dicarboxylic acids, ethylenically unsaturated alkenyl dicarboxylic acids, or mixtures of two or more of these acids. Preferred are alkyl dicarboxylic diacids which generally will contain 4 to 36 carbon atoms, and aromatic dicarboxylic diacids which generally contain 9 to 20 carbon atoms. Examples of useful dicarboxylic acids include oxalic, malonic, dimethylmalonic, succinic, glutaric, adipic, trimethyladipic, pimelic, 2,2-dimethylglutaric, azelaic, sebacic, suberic, 1,3-cyclopentanedicarboxylic, 1,2-cyclohexanedicarboxylic, 1,3-cyclohexanedicarboxylic, 1,4-cyclohexanedicarboxylic, phthalic, terephthalic, isophthalic, tetrahydrophthalic, hexahydrophthalic, 2,5-norbornanedicarboxylic, 1,4-naphthalic, diphenic, 4,4'-oxydibenzoic, diglycolic, thiodipropionic, 4,4'-sulfonyldibenzoic, and 2,5-naphthalenedicarboxylic acids. Anhydrides of any of the foregoing are also contemplated.

Preferred difunctional dicarboxylic acids include isophthalic acid, terephthalic acid, phthalic acid, adipic acid, tetrachlorophthalic acid, pivalic acid, dodecanedioic acid, sebacic acid, azelaic acid, 1,4-cyclohexanedicarboxylic acid, 1,3-cyclohexanedicarboxylic acid, maleic acid, fumaric acid, succinic acid, 2,6-naphthalenedicarboxylic acid, glutaric acid, and any of the anhydrides thereof.

Diol compounds that can be used in the present invention include glycols, of which ethylene glycol is the preferred diol.

In cases where glycols in addition to, or instead of, ethylene glycol are utilized, it is preferable for them to contain from 3 to 10 carbon atoms. In cases where glycol ethers are utilized in conjunction with ethylene glycol in the diol component, it is preferable for them to contain from 4 to 10 carbon atoms. Some representative examples of glycols that can be used in conjunction with or instead of ethylene glycol include 1,3-propylene glycol, 1,2-propylene glycol, 2,2-diethyl-1,3-propanediol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, 2,4-dimethyl-2-ethylhexane-1,3-diol, 1,2-cyclohexanediol, 1,3-cyclohexanedimethanol, 1,4-cyclohexanedimethanol, p-xylenediol, and 2,2,4,4-tetramethyl-1,3-cyclobutanediol.

As the diol component, polyether glycols can also be used, such as polypropylene glycol having a molecular weight of 200 to 6,000 (examples of which include ("Rezol ED-1000" and "Rezol ED-2000", sold by Witco Corporation); polyethylene glycol having a molecular weight of 200 to 6,000 (examples of which include ("Rezol PEG-400" and "Rezol PEG-1000", sold by Witco Corporation); and block and random copolymers of propylene glycol and ethylene glycol, having a molecular weight of 200 to 6,000 (examples of which include "Rezol EPD-112", "Rezol EPD-225", "Rezol EPD-56", and "Rezol EPD-28" sold by Witco Corporation).

If branching is desirable, then it will be advantageous to use a branching agent in the condensation polymerization reaction. Such branching agents may contain three or more functional groups, and they preferably contain three or four functional groups. The reactive groups may be carboxyl or aliphatic hydroxyl. The branching agent may contain both types of groups. Examples of acidic branching agents include trimesic acid, trimellitic acid, pyromellitic acid, butanetetracarboxylic acid, naphthalene tricarboxylic acids and cyclohexane-1,3,5-tricarboxylic acid. Examples of hydroxyl branching agents (polyols) include glycerin, trimethylpropane, pentaerythritol, dipentaerythritol, 1,2,6-hexanetriol and 1,3,5-trimethylolbenzene. Examples of hydroxy acid branching agents are 2,2-dihydroxymethyl propionic acid, 10,11-dihydroxy-undecanoic acid, and 5-(2-hydroxyethoxy) isophthalic acid. Generally from 0 to 3 percent of a polyol containing from 3 to 12 carbon atoms will be used as the branching agent (based upon the total diol component).

Instead of, or in addition to, the diol and polyol components, there can be present a diamine component. One type of suitable diamine is di-amino-substituted alkyl, preferably containing 3 to 8 carbon atoms, examples of which include compounds analogous to the aforementioned glycols and diols, wherein the hydroxyl substituents are replaced by amino groups.

Another type of suitable diamine is diamine-substituted polyoxyalkylene compounds, preferably poly(ethoxy) and/or poly(propoxy) compounds endcapped with amino groups. Examples of this type of reactant include compounds generalizable by the formula

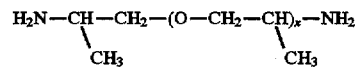

known as Jeffamine D230, D400, D2000, and D4000 (previously sold by Texaco Chemical Co., now Huntsman Chemical) corresponding to said formula wherein x is 2–3, 5–6, about 33, and about 68, respectively.

As indicated, condensation polymers useful in this invention also include bifunctional compounds such as hydroxyacids and amino acids, which are polymerized head-to-tail in known manner. Such reactants would have to include some ethylenically unsaturated compounds. Examples of such reactants include 6-hydroxy (or 6-amino) hexanedioic acid, and the like.

The acid component (which, as defined above, comprises one or more acids and/or anhydrides) and the one or more reactants destined to react with the acid or anhydride component are selected so that the reactants that enter into the condensation polymerization include a sufficient amount of sulfonation so that the sulfonated reaction product of the present invention provides a satisfactory degree of water dispersibility in the polymer.

Thus, the amount of sulfonated reactant can comprise 1 mol. % to 50 mol. % of the reaction mixture in the second step of the process. Generally, the sulfonated reactant(s) comprise about 1 mol. % to about 10 mol. % of the reaction mixture. The reactants are otherwise selected to be approximately equimolar in relationship to each other with the proviso that the component which carries the substituent group identical to the desired terminal group or groups of the polymer should be provided in stoichiometric excess.

Thus, for instance, if it is desired that the polymer product contains carboxylic terminal groups, then an excess of the acid component should be provided. If it is desired that the polymer should be endcapped with hydroxyl terminal groups, then an excess of the diol component should be supplied. On the other hand, if it is desired that the polymer should be endcapped with amino terminal groups, then an excess of the diamine component should be supplied. It should be recognized that for these purposes the terms "diacid component," "diol component," and "diamine component" are intended to include all components of the reaction mixture whether or not ethylenically unsaturated. It will also be recognized that to ensure that the polymer is capped with the desired terminal groups, it may be necessary to provide in the reaction mixture more than simply a slight stoichiometric excess of the indicated component; the degree of excess is tempered, however, by the effect of that excess on the distribution of polymeric chain lengths formed by the condensation polymerization.

The condensation polymer can also be one which contains only one terminal carboxylic acid, hydroxyl or amino group. For instance, a $C_1$-$C_6$ alkoxy (e.g. methoxy)-capped polyethylene glycol is reacted with ethylene glycol, acetic anhydride and maleic anhydride to form a polyester which is capped with a hydroxyl group and a methyl group, and which contains ethylenic unsaturation. In addition, one can prepare a polymer that is mono-capped with a desired functional group by preparing a condensation polymer which is disubstituted with functional terminal groups, and then capping one end of the molecule. For instance, a diamine-capped or di-hydroxyl-capped polymer can be reacted with a lower ($C_1$-$C_6$) alkanoic carboxylic acid to cap one end of the polymer with an ester or amide. Likewise, a dicarboxylic acid-capped polymer can be reacted with a ($C_1$-$C_6$) alcohol or ($C_1$-$C_6$) alkyl amine, to cap one of the two carboxylic acid moieties with an ester or amide.

The reaction mixture is then subjected to condensation polymerization conditions effective to cause the reactants to react with each other to form the desired condensation polymers. In general, effective condensation polymerization conditions are readily familiar to (and ascertainable by) the practitioner. It is preferred not to carry out the reaction in a solution. However, if a solvent is desired, it should be high boiling (i.e. a boiling point above about 140° C.) Examples of suitable solvents include DMF (dimethylformamide), DMA (N,N-dimethylacetamide), xylene and DMSO.

Preferably, the reactant mixture for carrying out the condensation polymerization includes a small but effective amount such as up to about 0.02 wt. % of a catalyst for the polymerization. Useful catalytic compounds include protonic acids, tin compounds, titanium compounds and antimony compounds.

Typical condensation polymerization conditions are provided by exposing the reactants to temperatures on the order of about 150° C. to about 250° C. During the progress of the reaction, it is preferred to draw off water of condensation. To effectively carry out the desired condensation polymerization it is preferred to use nitrogen to purge the reaction mixture in order to carry out the water.

The chain length or molecular weight of the polymers that are useful and produced in the process of the present invention can fall within a rather wide range; typically, useful polymers will have a molecular weight in the range of about 200 to about 50,000. Thus, amounts and identities of the reactants can readily be tailored to achieve any desired molecular weight and distribution.

At the end of the condensation polymerization, the product can be recovered and separated from the reaction mixture.

The process of the present invention affords several significant advantages compared to other processes for producing water-dispersible sulfonated polymers. In particular, each of the foregoing steps can be carried out under relatively mild conditions and are not particularly constrained by the choice of reactants. In particular, a much greater freedom in choice of reactants is provided, as the reactants in the condensation polymerization step can be polymerized under relatively straightforward condensation polymerization conditions and the sulfonation step can be carried out under fairly conventional sulfonation conditions. This freedom in the choice of reactants is an advantage in that it affords greater range in the tailoring of the properties of the final, water-dispersible product.

In addition, the ability to select the identity of the terminal groups on the polymers affords the operator greater freedom in incorporating the process of the present invention into processes that use the water-dispersible product as an intermediate in the synthesis of, for example, polyurethanes by reaction of the appropriately end-capped polymer with other reactive species such as diisocyanates or additional quantities of dicarboxylic acids, as the case may be.

The invention will be described further in the following examples. These examples are intended for illustrative purposes, and are not intended to limit the scope of applicants' invention.

EXAMPLE 1

A. Preparation of adduct (50%) [2-(sodiosulfo)-1,4-butanedioic acid]

| RAW MATERIAL | |
|---|---|
| Maleic Anhydride | 111.4 grams |
| Water | 270.5 grams |
| Sodium Bisulfite | 118.2 grams |

PROCEDURE

A four neck glass flask, equipped with a nitrogen inlet, a stirrer, a water condenser, and a thermometer, was charged with maleic anhydride. A clear water solution of sodium bisulfite was added under constant agitation and the temperature was maintained at 75°–80° C. for four hours. The conversion of sulfonation was 100%, and the solid content was 50%.

B. Preparation of sodium sulfonate-containing polyester.

| RAW MATERIAL | |
|---|---|
| 1,6-Hexanediol | 997 grams |
| Neopentyl Glycol (90%) | 853 grams |
| Product of step A. (as 50 wt. % aqueous solution) | 1,017 grams |
| Adipic Acid | 1,821 grams |
| Total Load | 4,688 grams |
| Organotin Catalyst | 0.30 grams |
| Water to distill | 1,156 grams |
| Theoretical Yield | 3,532 grams |

PROCEDURE

A four neck glass flask, equipped with a nitrogen inlet, a stirrer, a column, and a thermometer, was charged with catalyst, 1,6-hexanediol, neopentyl glycol, a 50 wt. % solution of the product of step A, and adipic acid. The temperature was increased to 150° C.±5°, while the column was kept hot using steam. The nitrogen and agitation were increased, as the reaction proceeded, to facilitate the water removal, but not rapid enough to blow out the glycol.

Hydroxyl value and acid number were checked as needed and the loss of glycol during the reaction was adjusted to reach the theoretical hydroxyl value. Reaction was considered complete when the hydroxyl number and the acid number reached the expected values. The final sodium sulfonate-containing polyester had a hydroxyl number of 108, and an acid number of 3.0. The polymer, a sulfonate polyester, dispersed in water very easily, and demonstrated good stability.

C. Preparation of sodium sulfonate-containing branched polyester.

| RAW MATERIAL | |
|---|---|
| Diethylene Glycol | 771 grams |
| Glycerine | 18.1 grams |
| Product of step A. (as 50 wt. % aqueous solution) | 732 grams |
| Adipic Acid | 752 grams |
| Total Load | 2,273 grams |
| Organotin Catalyst | 0.14 grams |
| Water to distill | 611 grams |
| Theoretical Yield | 1,662 grams |

PROCEDURE

A four neck glass flask, equipped with a nitrogen inlet, a stirrer, a column, and a thermometer, was charged with catalyst, diethylene glycol, glycerine, a 50 wt. % solution of the product of step A., and adipic acid. The temperature was increased to 150° C.±5°, while the column was kept hot using steam. The nitrogen and agitation were increased, as the reaction proceeded, to facilitate the water removal, but not rapid enough to blow out the glycol.

Hydroxyl value and acid number were checked as needed and the loss of glycol during the reaction was adjusted to reach the theoretical hydroxyl value. Reaction was considered complete when the hydroxyl number and the acid number reached the expected values. The final sodium sulfonate-containing polyester had a hydroxyl number of 53.6, and an acid number of 1.85. The polymer, a sulfonate polyester, dispersed in water very easily, and the dispersed polyester demonstrated good stability.

D. Preparation of sodium sulfonate-containing amine-terminated polyether/polyamide.

| RAW MATERIAL | |
|---|---|
| Jeffamine D-1000 | 499 grams |
| Product of step A. (as 50 wt. % aqueous solution) | 101 grams |
| Total Load | 600 grams |
| Organotin Catalyst | 0.04 grams |
| Water to distill | 59 grams |
| Theoretical Yield | 541 grams |

PROCEDURE

A four neck glass flask, equipped with a nitrogen inlet, a stirrer, a column, and a thermometer, was charged with catalyst, Jeffamine D-1000, and the product of step A. The temperature was increased to 150° C.±5°, while the column was kept hot using steam. The nitrogen and agitation were increased, as the reaction proceeded, to facilitate the water removal. Reaction was considered complete when the amine number and the acid number reached the expected values. The final sodium sulfonate-containing polyamide had a amine number of 62.5, and an acid number of 5.2.

EXAMPLE 2

A. Preparation of Adduct [half ester from one mole of maleic anhydride and one mole of 1, 6-hexanediol].

| RAW MATERIAL | |
|---|---|
| 1,6-Hexanediol | 546.3 grams |
| Maleic Anhydride | 453.7 grams |
| Total Load | 1,000.0 grams |
| Theoretical Yield | 1,000.0 grams |
| Sodium Bisulfite | 661.0 grams |
| Water | 2,061.0 grams |

PROCEDURE

A four neck glass flask, equipped with a nitrogen inlet, a stirrer, a water condenser, and a thermometer, was charged with 1,6-hexanediol, and maleic anhydride (the molar ratio of 1,6-hexanediol to maleic anhydride is 1/1), and heated to approximately 80° C. After two hours, a clear water solution of sodium bisulfite was added under constant agitation and the temperature was maintained at 75°–80° C. for eight hours. The conversion of sulfonation was 100%, and the solid content was 50%.

B. Preparation of sodium sulfonate-containing polyester.

| RAW MATERIAL | |
|---|---|
| 1,6-Hexanediol | 421 grams |
| Product of step A. (as 50 wt. % aqueous solution) | 303 grams |
| Adipic Acid | 390 grams |
| Total Load | 1,114 grams |
| Organotin Catalyst | 0.07 grams |
| Water to distill | 248 grams |
| Theoretical Yield | 866 grams |

PROCEDURE:

A four neck glass flask, equipped with a nitrogen inlet, a stirrer, a column, and a thermometer, was charged with catalyst, 1,6-hexanediol, a 50 wt. % aqueous solution of the product of step A., and adipic acid. The temperature was increased to 190° C.±5°, while the column was kept hot using steam. The nitrogen and agitation were increased, as the reaction proceeded, to facilitate the water removal, but not rapid enough to blow out the glycol.

Hydroxyl value and acid number were checked as needed and the loss of glycol during the reaction was adjusted to reach the theoretical hydroxyl value. Reaction was considered complete when the hydroxyl number and the acid number reached the expected values. The final sodium sulfonate-containing polyester had a hydroxyl number of 108.3, and an acid number of 0.7. The polymer, a sulfonate polyester, dispersed in water very easily, and the dispersed polyester demonstrated good stability.

EXAMPLE 3

A. Preparation of Adduct [bis(hydroxyhexyl) maleate, one mole of maleic anhydride and two moles of 1,6-hexanediol].

| RAW MATERIAL | |
|---|---|
| 1,6-Hexanediol | 3,228 grams |
| Maleic Anhydride | 1,341 grams |
| Total Load | 4,569 grams |
| Organotin Catalyst | 0.38 grams |
| Water to distill | 246 grams |
| Theoretical Yield | 4,323 grams |
| Sodium Bisulfite | 1,417 grams |
| Water | 4,234 grams |

PROCEDURE

A four neck glass flask, equipped with a nitrogen inlet, a stirrer, a column, and a thermometer, was charged with catalyst, 1,6-hexanediol, and maleic anhydride (the molar ratio of 1,6-hexanediol to maleic anhydride is 2/1), and heated to approximately 80° C. The temperature was increased to 225° C.±5°, while the column was kept hot using steam. The nitrogen and agitation were increased, as the reaction proceeded, to facilitate the water removal, but not rapid enough to blow out the glycol.

Hydroxyl value and acid number were checked as needed and the loss of glycol during the reaction was adjusted to reach the theoretical hydroxyl value. Reaction was considered complete when the hydroxyl number and the acid number reached the expected values. The final polyester had a hydroxyl number of 353.6 and an acid number of 0.3.

The reaction mixture was cooled to 85° C. The column was replaced with a water condenser and nitrogen was shut off. A clear water solution of sodium bisulfite was added under constant agitation and the temperature was maintained at 75°–80° C. for eight hours. The conversion of sulfonation was 100%, and the solid content was 60%.

B. Preparation of sodium sulfonate-containing polyester.

| RAW MATERIAL | |
|---|---|
| 1,6-Hexanediol | 457 grams |
| Product of step A. of Ex. 3 (as 60 wt. % aqueous solution) | 141 grams |
| Adipic Acid | 532 grams |
| Total Load | 1,130 grams |
| Organotin Catalyst | 0.08 grams |
| Water to distill | 188 grams |
| Theoretical Yield | 942 grams |

PROCEDURE

A four neck glass flask, equipped with a nitrogen inlet, a stirrer, a column, and a thermometer, was charged with catalyst, 1,6-hexanediol, a 60 wt. % aqueous solution of the product of step A., and adipic acid. The temperature was increased to 190° C.±5°, while the column was kept hot using steam. The nitrogen and agitation were increased, as the reaction proceeded, to facilitate the water removal, but not rapid enough to blow out the glycol.

Hydroxyl value and acid number were checked as needed and the loss of glycol during the reaction was adjusted to reach the theoretical hydroxyl value. Reaction was considered complete when the hydroxyl number and the acid number reached the expected values. The final sodium sulfonate-containing polyester had a hydroxyl number of 43.1, and acid number of 0.8.

C. Preparation of sodium sulfonate-containing polyester via transesterification method.

| RAW MATERIAL | |
|---|---|
| Fomrez 66-56* | 832 grams |
| Product of step A. of Ex. 3 (as 60 wt. % aqueous solution) | 296 grams |
| Total Load | 1,128 grams |
| Water to distill | 128 grams |
| Theoretical Yield | 1,000 grams |

*Poly(hexamethylene adipate) glycol, molecular weight 2,000, from Witco Corporation

PROCEDURE

A four neck glass flask, equipped with a nitrogen inlet, a stirrer, a column, and a thermometer, was charged with Fomrez 66-56, and a 60 wt. % aqueous solution of the product of step A. The temperature was increased to 190° C.±5°, while the column was kept hot using steam. The nitrogen and agitation were increased, as the reaction proceeded, to facilitate the water removal, but not rapid enough to blow out the glycol.

Hydroxyl value and acid number were checked as needed. The final sodium sulfonate-containing polyester had a hydroxyl number of 73.4. The polymer, a sulfonate polyester, dispersed in water very easily, and the dispersed polyester demonstrated good stability.

EXAMPLE 4

A. Preparation of adduct [2-(sodiosulfo)-1,4-butanediol] (50%).

| RAW MATERIAL | |
|---|---|
| 2-Butene-1,4-diol | 350 grams |
| Water | 765 grams |
| Sodium Bisulfite | 414 grams |
| t-Butyl hydroperoxide | 42 grams |

PROCEDURE

A four neck glass flask, equipped with a nitrogen inlet, a stirrer, a water condenser, and a thermometer, was charged with 2-butene-1,4-diol. A clear water solution of sodium bisulfite was added under constant agitation, then t-butyl hydroperoxide was added. The temperature was maintained at 75°–80° C. for 24 hours. The conversion of sulfonation was 70%, and the solid content was 50%.

Preparation of sodium sulfonate-containing polyester.

| RAW MATERIAL | |
|---|---|
| 1,4-Butanediol | 773 grams |
| Product of step A. of Ex. 4 (as 50 wt. % aqueous solution) | 299 grams |
| Adipic Acid | 1,089 grams |
| Total Load | 2,161 grams |
| Organotin Catalyst | 0.14 grams |
| Water to distill | 445 grams |
| Theoretical Yield | 1,716 grams |

PROCEDURE

A four neck glass flask, equipped with a nitrogen inlet, a stirrer, a column, and a thermometer, was charged with catalyst, 1,4-butanediol, the 50 wt. % aqueous solution of the product of step A., and adipic acid. The temperature was increased to 150° C.±5°, while the column was kept hot using steam. The nitrogen and agitation were increased, as the reaction proceeded, to facilitate the water removal, but not rapid enough to blow out the glycol.

Hydroxyl value and acid number were checked as needed and the loss of glycol during the reaction was adjusted to reach the theoretical hydroxyl value. Reaction was considered complete when the hydroxyl number and the acid number reached the expected values. The final sodium sulfonate-containing polyester had a hydroxyl number of 96.8, an acid number of 3.9.

EXAMPLE 5

A. Preparation of adduct [half ester from one mole of maleic anhydride and one mole of diethylene glycol].

| RAW MATERIAL | |
|---|---|
| Diethylene Glycol | 1559 grams |
| Maleic Anhydride | 1441 grams |
| Total Load | 3,000 grams |
| Theoretical Yield | 3,000 grams |
| Sodium Bisulfite | 1,499 grams |
| Water | 4,499 grams |

PROCEDURE

A four neck glass flask, equipped with a nitrogen inlet, a stirrer, a water condenser, and a thermometer, was charged with diethylene glycol and maleic anhydride (the molar ratio of diethylene glycol to maleic anhydride was 1/1), and heated to approximately 80° C. After two hours, a clear water solution of sodium bisulfite was added under constant agitation and the temperature was maintained at 75°–80° C. for eight hours. The conversion of sulfonation was 100%, and the solid content was 50%.

B. Preparation of dicarboxylic acid-terminated sodium sulfonate-containing polyester.

| RAW MATERIAL | |
|---|---|
| Diethylene Glycol | 530 grams |
| Product of step A. of Ex. 5 (as 50 wt. % aqueous solution) | 359 grams |
| Total Load | 1,832 grams |
| Organotin Catalyst | 0.12 grams |
| Water to distill | 370 grams |
| Theoretical Yield | 1,462 grams |

PROCEDURE

A four neck glass flask, equipped with a nitrogen inlet, a stirrer, a column, and a thermometer, was charged with catalyst, diethylene glycol, a 50 wt. % aqueous solution of the product of step A., and adipic acid. The temperature was increased to 180° C.±5°, while the column was kept hot using steam. The nitrogen and agitation were increased, as the reaction proceeded, to facilitate the water removal, but not rapid enough to blow out the glycol.

Hydroxyl value and acid number were checked as needed. Reaction was considered complete when the hydroxyl number and the acid number reached the expected values. The final dicarboxylic acid-terminated sodium sulfonate-containing polyester had a hydroxyl number of 13.6, and an acid number of 108.7. The polymer, a dicarboxylic acid-terminated sulfonate polyester, was dispersed in water very easily, and the dispersed polyester demonstrated good stability.

EXAMPLE 6

A. Preparation of Adduct [half ester from one mole of maleic anhydride and one mole of 1,4-butanediol].

| RAW MATERIAL | |
|---|---|
| 1,4-Butanediol | 670 grams |
| Maleic Anhydride | 730 grams |
| Total Load | 1,400 grams |
| Theoretical Yield | 1,400 grams |
| Sodium Bisulfite | 758 grams |
| Water | 2,158 grams |

PROCEDURE

A four neck glass flask, equipped with a nitrogen inlet, a stirrer, a water condenser, and a thermometer, was charged with 1,4-butanediol, and maleic anhydride (the molar ratio of 1,4-butanediol to maleic anhydride was 1/1), and heated to approximately 80° C. After two hours, a clear water solution of sodium bisulfite was added under constant agitation and the temperature was maintained at 75°–80° C. for eight hours. The conversion of sulfonation was 100%, the solid content was 50%, and the pH of the aqueous solution was 3.0.

B. Preparation of sodium sulfonate-containing polyester.

| RAW MATERIAL | |
|---|---|
| 1,4-Butanediol | 1,829 grams |
| Product of step A. of Ex. 6 (as 50 wt. % aqueous solution) | 1,625 grams |
| Adipic Acid | 2,313 grams |
| Total Load | 5,768 grams |
| Organotin Catalyst | 0.36 grams |
| Water to distill | 1,433 grams |
| Theoretical Yield | 4,300 grams |

PROCEDURE

A four neck glass flask, equipped with a nitrogen inlet, a stirrer, a column, and a thermometer, was charged with catalyst, 1,4-butanediol, a 50 wt. % aqueous solution of the product of step A. (pH 3.0), and adipic acid. The temperature was increased to 190° C.±5°, while the column was kept hot using steam. The nitrogen and agitation were increased, as the reaction proceeded, to facilitate the water removal, but not rapid enough to blow out the glycol.

Hydroxyl value and acid number were checked as needed and the loss of glycol during the reaction was adjusted to reach the theoretical hydroxyl value. Reaction was considered complete when the hydroxyl number and the acid number reached the expected values. The final sodium sulfonate-containing polyester had a hydroxyl number of 52.2, an acid number of 2.1. The polymer, a sulfonate polyester, dispersed in water very easily, and the dispersed polyester demonstrated good stability. However, the loss of the 1,4-butanediol was significant and tetrahydrofuran formation from 1,4-butanediol during the reaction was observed.

C. Preparation of sodium sulfonate-containing polyester.

| RAW MATERIAL | |
| --- | --- |
| 1,4-Butanediol | 394 grams |
| Product of step A. of Ex. 6 (as 50 wt. % aqueous solution) | 213 grams |
| Adipic Acid | 562 grams |
| Total Load | 1,169 grams |
| Organotin Catalyst | 0.08 grams |
| Water to distill | 252 grams |
| Theoretical Yield | 907 grams |

PROCEDURE

A four neck glass flask, equipped with a nitrogen inlet, a stirrer, a column, and a thermometer, was charged with catalyst, 1,4-butanediol, a 50 wt. % aqueous solution of the product of step A. (pH adjusted to 4.0 by adding sodium hydroxide), and adipic acid. The temperature was increased to 190° C.±5°, while the column was kept hot using steam. The nitrogen and agitation were increased, as the reaction proceeded, to facilitate the water removal, but not rapid enough to blow out the glycol.

Hydroxyl value and acid number were checked as needed and the loss of glycol during the reaction was adjusted to reach the theoretical hydroxyl value. Reaction was considered complete when the hydroxyl number and the acid number reached the expected values. The final sodium sulfonate-containing polyester had a hydroxyl number of 57.26, an acid number of 2.0. The polymer, a sulfonate polyester, dispersed in water very easily, and the dispersed polyester demonstrated good stability. No tetrahydrofuran formation from 1,4-butanediol during the reaction was observed.

What is claimed is:

1. A process for producing a water-dispersible polymer, comprising:
   (a) sulfonating an ethylenically unsaturated monomeric precursor which has no aromatic ring and which is substituted with at least two groups selected from the group consisting of —OH, —COOH, and —NH$_2$, with a sulfonating agent to form a sulfonated monomeric precursor which is substituted with at least two groups selected from the group consisting of —OH, —COOH, and —NH$_2$; and
   (b) reacting said sulfonated monomeric precursor with a difunctional second monomer capable of undergoing condensation polymerization with said sulfonated monomeric precursor, under conditions whereunder said precursor and said second monomer undergo condensation polymerization.

2. A process according to claim 1 wherein said sulfonating agent is selected from the group consisting of bisulfites, metabisulfites, and mixtures thereof.

3. A process according to claim 1 wherein said ethylenically unsaturated monomeric precursor is a diacid.

4. A process according to claim 3 wherein said diacid contains 4 to 36 carbon atoms.

5. A process according to claim 3 wherein said diacid is selected from the group consisting of maleic acid, fumaric acid, mesaconic acid, citraconic acid, muconic acid, itaconic acid, and 2-vinyl-butane-1,4-dioic acid.

6. A process according to claim 1 wherein said ethylenically unsaturated monomeric precursor is an anhydride.

7. A process according to claim 6 wherein said anhydride contains 4 to 36 carbon atoms.

8. A process according to claim 6 wherein said anhydride is selected from the group consisting of anhydrides of maleic acid, fumaric acid, mesaconic acid, citraconic acid, muconic acid, itaconic acid, and 2-vinyl-butane-1,4-dioic acid.

9. A process according to claim 1 wherein said ethylenically unsaturated monomeric precursor is a diamine.

10. A process according to claim 9 wherein said diamine contains 2 to 12 carbon atoms.

11. A process according to claim 9 wherein said diamine is a diamino-alkene containing 2 to 12 carbon atoms.

12. A process according to claim 1 wherein said ethylenically unsaturated monomeric precursor is a diol.

13. A process according to claim 12 wherein said diol contains 4 to 10 carbon atoms.

14. A process according to claim 12 wherein said diol is selected from the group consisting of 1,4-butenediol, 1,4-butynediol, glycerine allyl ether, glyceryl monostearate, and mono-acrylates and mono-methacrylates of glycol.

15. A process for producing a water-dispersible polymer, comprising
   (a) reacting an ethylenically unsaturated anhydride or diacid which has no aromatic ring, a diol or diamine, and a sulfonating agent, to form a reaction product which is a sulfonated mono- or bis-ester or amide, which is substituted with at least two groups selected from —COOH, —OH and —NH$_2$; and
   (b) reacting said reaction product with a difunctional second monomer capable of undergoing condensation polymerization with said sulfonated monomeric precursor, under conditions whereunder said precursor and said second monomer undergo condensation polymerization.

16. A water-dispersible polymer prepared by the process of claim 1.

17. A water-dispersible polymer prepared by the process of claim 3.

18. A water-dispersible polymer prepared by the process of claim 6.

19. A water-dispersible polymer prepared by the process of claim 9.

20. A water-dispersible polymer prepared by the process of claim 12.

21. A water-dispersible polymer prepared by the process of claim 15.

* * * * *